United States Patent [19]

Bothwell

[11] 4,376,374
[45] Mar. 15, 1983

[54] METAL-CERAMIC COMPOSITE AND METHOD FOR MAKING SAME

[75] Inventor: Bruce E. Bothwell, Zurich, Switzerland

[73] Assignee: Repwell Associates, Inc., Bloomfield Hills, Mich.

[21] Appl. No.: 225,937

[22] Filed: Jan. 19, 1981

Related U.S. Application Data

[62] Division of Ser. No. 852,128, Nov. 16, 1977, Pat. No. 4,276,331, which is a division of Ser. No. 652,008, Jan. 26, 1976, Pat. No. 4,059,712.

[51] Int. Cl.³ .............................................. F01N 3/10
[52] U.S. Cl. ................................. 60/687; 123/52 M; 123/668; 428/241
[58] Field of Search ........ 123/193 R, 193 C, 193 CH, 123/193 H, 668, 669, 52 M; 164/97, 98, 111; 428/210, 241, 450; 60/687, 753

[56] References Cited

U.S. PATENT DOCUMENTS

| | | | |
|---|---|---|---|
| 2,676,899 | 4/1954 | Hackley | 427/376.4 X |
| 2,975,078 | 3/1961 | Rayfield | 427/376.4 X |
| 3,718,172 | 2/1973 | Rice et al. | 164/98 X |
| 3,794,551 | 2/1974 | Landingham et al. | 156/89 X |
| 3,919,755 | 11/1975 | Kaneko et al. | 428/450 X |
| 3,949,552 | 4/1976 | Kaneko et al. | 123/193 R X |

*Primary Examiner*—William A. Cuchlinski, Jr.
*Attorney, Agent, or Firm*—Reising, Ethington, Barnard, Perry & Brooks

[57] ABSTRACT

The composite of the present invention comprises a layer of ceramic having completely imbedded therein a metal grid, such composite having been made by coating a metal grid with a viscous ceramic slurry and thereafter firing to form the ceramic to a unitary structure. At the temperature to which the composite is fired to form the unitary structure the metal grid is in an expanded condition because of its high coefficient of thermal expansion, and upon cooling the metal grid is put into tension thereby putting the ceramic in compression. The composite is used as a liner for a metal wall which is cast with the liner in situ and is disclosed as having a hollow shape about which the cast wall extends in a manner having particular utility for insulated components of internal combustion engines.

2 Claims, 6 Drawing Figures

METAL-CERAMIC COMPOSITE AND METHOD FOR MAKING SAME

This application is a division of pending U.S. patent application Ser. No. 852,128 which was filed on Nov. 16, 1977 issued on June 30, 1981 as U.S. Pat. No. 4,276,331 and which as a division of patent application Ser. No. 652,008, filed on Jan. 26, 1976, and issued on Nov. 22, 1977 as U.S. Pat. No. 4,059,712.

The subject matter of the present invention is a metal-ceramic composite and a method for its manufacture. Composites made in accordance with the invention have particular utility as thermal insulation and hence the invention will be described chiefly in connection with this end use of the invention.

There are numerous instances where there are needs for a good thermal insulating material but which needs are not being filled adequately because of lack of an economically practical material which has all the characteristics and physical properties required. An example of this is the plausibility for a thermal insulating liner in the exhaust system of an internal combustion engine fitted with a catalytic converter. This is because the efficiency of a catalytic converter in catalyzing unburned hydrocarbons and carbon monoxide to carbon dioxide and water, or the reduction of the oxides of nitrogen, is dependent on the catalytic bed temperature. Hence, at engine start-up when the catalytic bed is cold the efficiency is low, and the less the time required to heat the catalyst bed to a high temperature, the greater the efficiency of the system. To this end, it is desirable to thermally insulate the inner surfaces of the exhaust system leading from the engine to the catalytic converter with thermal insulating material so that a maximum of the heat in the exhaust gases from the engine reaches the catalyst bed to increase and maintain its temperature. Due to the carrying of the heat to the catalyst bed away from the engine, the total underhood temperature will be reduced significantly, benefiting various underhood components. Any thermal insulating material used must, of course, have sufficient heat resistance to withstand the high temperatures encountered. This suggests the use of ceramic since most ceramics have relatively low thermal conductivity and high temperature resistance. One solution would appear to be to coat the inner surfaces of the exhaust pipe with ceramic. However, this is unsatisfactory because of the considerable difference in the coefficients of thermal expansion of metal and ceramic and because ceramic, in solid monolithic form, is relatively brittle or non-elastic. As a result, the ceramic cracks, breaks and spalls off of the exhaust pipe surfaces. If, on the other hand, the ceramic used is not of solid monolithic structure but instead of fibrous structure, the cracking and spalling problem takes a different aspect since the physical strength of the fibrous ceramic is not sufficient to withstand the relatively high velocity and pulsating flow of the exhaust gases and will therefore deteriorate rapidly. In short, ceramics of fibrous or the like structure will eventually break down or get blown off the exhaust pipe surfaces by the exhaust gases.

Hence, there is great need for relatively low cost thermal insulating materials having not only good thermal insulating properties but also good structural mechanical strength, resistance to severe cracking or other deterioration by thermal cycling, and ample physical strength to withstand deterioration or attrition from exposure to flowing and pulsating hot gases. The present invention fulfills these and many such needs.

In the prior art is has been proposed to make high impact resistant plate by hot pressing, between graphite or the like dies, ceramics such as aluminum oxide, and with a high temperature resistant metal screen imbedded therein, thereby to provide a high strength, and hence impact resistant, plate consisting of a composite of hot pressed and therefore very dense sintered ceramic with the high temperature resistant metal screen imbedded therein. But the difficulties with this are manifold. First, the requirement for hot pressing places severe limitations on the shapes that can be made. Secondly, the requirement for hot pressing incurs manufacturing costs which prices the resulting composite out of most markets such as that for a good high temperature resistant thermal insulator. Thirdly, whereas the high density of such a composite might have value where impact resistance is essential, it has no value, and indeed can be disadvantageous, where other properties are of importance such as the properties required for an effective high temperature resistant thermal insulator.

Briefly, in accordance with the present invention there is provided a material which has the aforesaid combination of properties and which is a composite made by coating a metal grid with a ceramic slurry thereby to form a layer of the ceramic with the metal grid imbedded therein, and then firing the ceramic, at or less than ordinary atmospheric pressure, to a temperature at with the ceramic forms a monolithic structure. Upon cooling, the metal grid is in tension and the ceramic is in compression—this because the grid is in an expanded condition during firing because of its high coefficient of thermal expansion. Particularly because of the metal grid the composite has excellent physical strength and because the ceramic is of solid monolithic structure the composite can easily withstand the high velocity and pulsating flow of hot gases with good longevity and durability. Further, even though the metal grid and the ceramic have different coefficients of thermal expansion, the composite has excellent resistance to cracking or other deterioration from thermal cycling—this because under most operating conditions the grid is in tension and the ceramic is in compression and due to the relatively thin walls of the ceramic there is a low temperature gradient which reduces cracking or conversely enhances thermal shock resistance. Still further, the composite as hereinafter described has very low thermal conductivity in a direction perpendicular to the plane of the metal grid, and hence the composite provides the excellent thermal insulating properties desired.

The mechanisms by which the composite functions as an insulator are very complex although well documented in heat transfer and ceramics technologies. Based on a review of heat transfer technology, three factors contributing to the outstanding insulation characteristics of the composite structure of this invention are (1) the reflectivity and emissivity characteristics of multiple surfaces, (2) stagnant gases—in spaces between composite layers, and (3) the low thermal conductivity of ceramic. Of these the first is the most important.

The metal-ceramic composites, which can be quite thin, have excellent, and in fact unusual, capabilities of serving as a high temperature radiation shielding. There are, of course, many applications for such shielding and include all high temperature systems in which heat is to be conserved through effective radiative insulation or an environment is to be protected from the presence of a high temperature body. All furnaces and combustion apparatus, including automobile exhausts, come under this category. The relative inertness of the metal-ceramic composites to extremely corrosive environments and this ability to withstand temperatures in excess of 2000° F. lend the composites of the invention an unusually good ability to serve as an insulator where its characteristics of radiative transfer and multiple shielding can be utilized.

Additional features of the insulating composite material are as follows:

The composites have good structural self-supporting characteristics. They can, for instance, be preformed in their preferred condition to the desired shape and easily attached in application without the need of additional support materials.

The composites can be preformed and machined to desired shape with a minimum of tooling. To line a cylindrical container, a sheet of the composite can be spirally wrapped upon itself to the inside diameter of the cylinder prior to firing or baking at the required temperature.

Due to the simplicity of construction, and method of manufacture as is hereinafter described, the insulation composite can be economically produced. The nature of the composite permits use of lower-cost metals in lower-temperature zones for structural components.

The composite can be inserted in a mold and cast around with molten metal, i.e. with the composite in situ, providing a simple method for insulating cast parts.

The composites have very good heat insulating characteristics with a minimum of space required as hereinafter described and illustrated by tests in automotive applications.

The composites have good thermal shock resistance. The use of the composite insulation in an automotive exhaust system which incurs thermal shock has proven the thermal toughness of the material. By use of the composites there are no serious thermal expansion problems since multiple layers are free to expand and contract independently.

These and other features and advantages of the composite as well as a preferred method for its manufacture, will now be described in detail, the description being with reference to the accompanying drawings in which.

Figure 1:
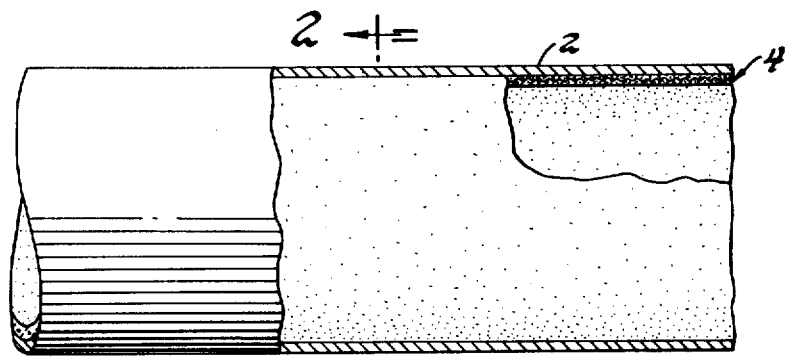
FIG. 1 is a side view with parts broken away and in partial section of an exhaust pipe embodying the present invention.

Referring now to FIG. 1, there is shown a portion of an internal combustion engine component embodied by an exhaust pipe 2 which functions to conduct exhaust gases from the exhaust manifold of an internal combustion engine, not shown, to a catalytic converter, likewise not shown. The exhaust pipe 2 includes a metal wall formed of ordinary or alloy steel as conventionally used for exhaust pipes, and it has a tubular liner 4 which functions as a thermal insulator and which is constructed in accordance with the present invention as will now be described.

Figure 2:
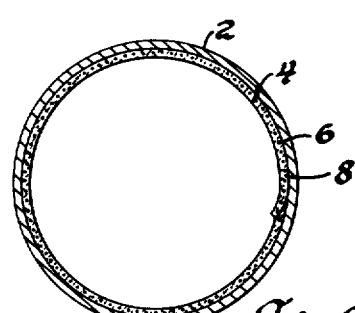
FIG. 2 is a section taken on line 2—2 of FIG. 1.
Figure 3:
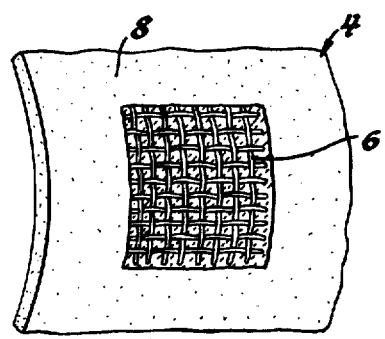
FIG. 3 is a fragmentary view with parts broken away of the lining of the exhaust pipe shown in FIG. 1.

As can best be seen in FIGS. 2 and 3, the liner 4 has a hollow tubular shape about which the metal wall of tube 2 extends in engagement therewith and is a composite of a metal grid 6 which is imbedded in a layer of ceramic 8. The composite liner 4 is inserted in a mold and cast around with molten metal, i.e. with the liner in situ, providing a simple method for insulating the cast wall. The metal grid 6 is usually in tension and the ceramic 8 is in compression. Since ceramic is strong in compression but weak in tension and metal is not only strong in compression but also strong in tension, the metal complements the ceramic in enhancing its mechanical properties while the ceramic serves to protect the metal from corrosion, abrasion, etc. As the temperature of the composite is raised, the greater expansion of the metal grid, relative to that of the ceramic at service temperature, does not place a tensile force on the ceramic but instead only relieves some of the compressive force. The end result is a composite which not only has the requisite heat resistance and resistance to cracking of the ceramic from heat cycling, but also much increased toughness and mechanical strength as compared to a structure consisting entirely of ceramic. In the embodiment shown in FIGS. 1-3, the metal grid is in the form of a metal screen, i.e. interwoven metal wires; however, as will be discussed hereinafter, the metal grid can take other forms. Also, whereas in the embodiment shown in FIGS. 1-3 the composite contains only a single layer of the metal grid, it is within the purview of the invention to use multiple layers of the composite material, such being advantageous where it is desired to have an insulating system of greater thermal insulation characteristics. A more complete understanding of the composite metal-ceramic structure will be gained from the description hereinafter to be given of a preferred method for manufacturing same. But before proceeding to the manufacturing method it is appropriate to discuss the requirements for each component of the composite.

THE METAL GRID

In selecting the material for the metal grid to be used in the composite structure, several essential factors must be taken into consideration. The metal grid must have a melting temperature above the temperature required to fire the ceramic to a unitary structure and should have a higher coefficient of thermal expansion than that of the ceramic. In general, the greater the coefficient of the thermal expansion of the metal grid relative to that of the ceramic, the greater the compression of the ceramic, and hence resistance to fracture from tensile forces, at operating temperatures below that at which the composite was fired whereas, conversely, the less the difference in the coefficients of thermal expansion of the metal grid and the ceramic, the greater the resistance of the composite to ceramic fracture at operating temperatures above that at which the composite was fired. Many ceramics can, of course, withstand temperatures greater than that to which they are fired during manufacture.

Also, it is much preferred that the metal of the grid be chemically inert with respect to the ceramic composition and, particularly where the ceramic of the composite has porosity, also with respect to the atmosphere in which the composite is to be used. Hence, when selecting the metal for the grid it is desirable to consider whether the atmosphere in which the composite is to operate will be oxidizing or reducing, carburizing, sulfurizing, etc. Of course, as to factors such as the latter, compromise may be necessary or desirable in many instances taking into account the further factor of cost and availability of the metal.

Numerous commerically available metals and alloys are well suited for the practice of the invention. For moderate to high temperature service, some of the nickel base alloys are attractive choices. They offer good strength with medium-to-high coefficient of thermal expansion, good oxidation and corrosion resistance and good toughness. Preferred commercial nickel base alloys falling into this category are as follows:

Inconel 600 (1) see footnote
Inconel 601 (1)
Ni-Chrome (2)
Hastelloy X (3)
RA 333 (4)

Additional information regarding source and designation of the alloys: (1) The International Nickel Company, Huntington Alloys Products Division, Huntington, West Virginia; (2) Driver-Harris Company, Harrison, New Jersey; (3) Haynes Stellite Company Kokomo, Indiana; (4) Rolled Alloys Company, Detroit, Michigan; (5) Allegheny-Ludlum Company, Pittsburgh, Pennsylvania; (6) The T numbers of the alloys so designated are the AISI (American Iron and Steel Institute) designations; (7) Kanthal Corporation, Bethel, Connecticut.

Another class of metal alloys, the common stainless steels, are also well suited for many end uses for the composites. The ferritic stainless steels are particularly attractive. They are low in cost, have satisfactory coefficients of thermal expansion, low as compared with other metals such as the austenitic stainless steels, and their oxidation resistance can range from good to outstanding. They are a good selection where low cost composites are needed for relatively high temperature applications.

The common austenitic stainless steels are stronger than the ferritic stainless steels at high temperatures. They are usually more expensive, offer superior corrosion resistance, and are characterized by higher coefficients of thermal expansion, somewhat in the same range as the nickel base alloys. Typical commercial stainless steels for use as the grid in the practice of the invention are:

| Ferritic Stainless | | Austenitic Stainless | |
|---|---|---|---|
| MF-1 | (5) see footnote | T-304 | (6) see footnote |
| T-409 | (6) | T-316 | (6) |
| T-430 | (6) | T-321 | (6) |
| T-442 | (6) | T-347 | (6) |
| T-446 | (6) | T-309 | (6) |
| KANTHAL A | (7) | T-310 | (6) |
| KANTHAL DS | (7) | RA-330 | (4) |
| | | MULTIMET N-155 | (3) |

For some applications other metals may be desirable. For special high temperature applications, for example the refractory metals and their alloys can be used, examples of such metals being zirconium, tungsten, molybdenum, platinum, paladium and tantalum.

Figure 6:
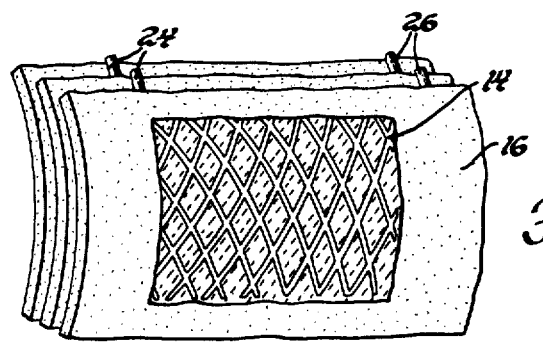
FIG. 6 is a view similar to that of FIG. 3 but showing the lining of the pipe shown in FIG. 4.

The metal or metal alloy can be formed into various configurations to form the grid, such as wire screen, expanded sheet or perforated sheet. By "screen" is meant an interwoven relationship between wires of the metal, such a screen being shown in FIG. 3. Expanded sheet metal, as conventionally referred to, is a thin sheet of metal which is provided with slits of various configurations and arrangements throughout the entire sheet which is simultaneously or thereafter stretched in a direction to open the slits, thereby to provide a unitary metal grid with holes therein. Such a structure is illustrated in FIG. 6. By perforated metal sheet is meant any of a number of patterns punched through a sheet of metal to provide a grid the same or similar to that provided by expanded metal sheet.

Both from the standpoint of ease of manufacture and from the standpoint of attaining composites having optimum physical characteristics, it is preferred that, as regards the precise structure of the grid, the openings therein be of substantially uniform shape and size, and with the size of the openings being, in their largest dimension, no greater than about ⅜ inch and no less than about 1/64 inch. (Where, for example, the openings are square, the largest dimension is the diagonal, and it is preferred that this dimension be no greater than ⅜ inch and no less than 1/64 inch.) Further, it is preferred that the ratio of the aggregate area of openings to the aggregate of the area of the metal between the openings be such that about 30% to 80% of the total area of the grid constitute openings, and the remainder of the area of the metal between the openings.

THE CERAMIC

As has been indicated, it is essential that the ceramic formulation be one which can be fired to its final unitary or monolithic structure at a temperature below the melting temperature of the grid. Where the metal used for the grid is such that at a temperature below the melting point it undergoes significant degradation in tensile strength or other physical properties, as by way of metallurgical structural change, it is desirable that the ceramic be such as can be fired to its unitary or monolithic structure at a lesser temperature than that at which the degradation in properties of the metal occurs. Further, it is essential to the practice of the invention that the ceramic slurry formulation used to coat the grid be such that the slurry clings to the grid, filling the openings therein, and remains thereon upon drying. This property can best be accomplished by including a binder material in the slurry formulation. The binder can and preferably should be any one or more of numerous inorganic materials, examples of which will be given hereinafter, which have bonding properties, i.e. provide good green bond strength, in the pre-fired state of the ceramic after drying and which provide a strong unitary or monolithic ceramic structure in the final fired state. As regards the latter, the inorganic binder remains in and constitutes a part of the ceramic through the firing operation, though generally undergoing reaction with other of the ceramic ingredients or transformation during the firing operation such as to appear at least partially in another form in the fired ceramic structure than the form in which added to the slurry. For example, where the binder is a silicate or colloidal silica, as the examples hereinafter given will illustrate, there may be transformation, as by reaction with other ingredients of the ceramic formulation, of the silica to a silicate or of the silicate to another silicate, such as a glass, in the final fired ceramic structure. But alternatively, or in addition to using an inorganic binder, organic binders can be used in the ceramic slurry, in which case the organic binder vaporizes or burns out during the firing operation. Hence, where the only binder used is an organic binder, the ceramic ingredient or ingredients of the slurry formulation should be such that during the firing operation there results the required bonding to provide the unitary or monolithic ceramic structure. Typical examples of organic binders are polyvinly alcohol, dextrine and the water-emulsifiable waxes well known in the ceramics art as temporary binders.

Numerous ceramic formulations well known in the art and extensively used in the precision and investment casting technology are suitable for the practice of the invention. For example, slurries, made up of any of various one or more ceramics, such as those set forth hereinafter, and suitable binding agents, examples of which are also listed hereinafter, are used in the mold making of ceramic shells and investment molds for the casting of complex shapes and high temperature turbine parts.

Typical ceramic materials useful for the practice of the invention, either alone or in combination are: zircon, quartz or fused silica, mullite, spodumene, magnesia, forsterite, magnesia-alumina spinel, silicon carbide, alumina, zirconia (stabilized), chromium oxide ($Cr_2O_3$) and stoichiometric cordierite or composition modifications of cordierite as are known in the art. It is desirable that the ceramic material be of small particle size, preferably 325 mesh or finer.

Though liquids other than water can be used for the slurry it is much preferred from the standpoint of cost and convenience and from all other standpoints, that water be used. Hence, it is desirable that the binder be either water soluble or such that it forms a colloidal suspension with water.

Examples of inorganic binders excellent for the practice of the invention are as follows: colloidal alumina, colloidal silica, sodium silicate, potassium silicate, calcium aluminate and kaolin or other clay. An example of an organic-inorganic binder suitable for use in the practice of the invention is ethyl silicate.

The initial bonding of ceramic particles with the above binders usually requires only relatively low temperatures; in many cases ambient or room temperature drying usually provides ample pre-fired bond strength. However, the full bond is not developed until the structure has been exposed to the temperature at which the ceramic formulation forms a unitary or monolithic structure. Where the composite is to be used in an environment which provides a high service temperature, this itself can be used to effect the final bonding. The required temperature naturally varies depending on the precise formulation, as well known in the ceramic art. In the case of the sodium silicate and alumina ceramic system, exemplified hereinafter, the final bonding apparently takes place by at least localized melting of the sodium silicate followed by rapid diffusion into, and at least partial reaction with, the alumina to form a highly bonded structure. Bonding can also be obtained with colloidal particle type binders, apparently also by solid diffusion and at least partial reaction with other of the ingredients at the required temperature to provide the unitary or monolithic structure. The gelling of the colloidal type binders is of value in providing good pre-fired dry bond strength.

It is not essential that the ceramic of the fired composite be of extremely high density and, indeed, for many applications such as for thermal insulation, porosity of as high as 10% or even higher can be desirable. By adding flour, powered wax, wood flour or other powdered organic material to the slurry in the desired proportions and particle sizes the amount of porosity can be controlled since in the firing operation the combustible material burns out and leaves pores.

The following are specific examples of ceramic slurries suitable for the practice of the invention:

EX. 1

112 grams of distilled water was added to 563 grams of commercial grade sodium silicate Type RU ($SiO_2$ 33.2%, $Na_2O$ 13.85%, $H_2O$ 52.95%) and electric-motor-propeller stirred to insure total mixing. To this solution was added 825 grams of commercial tabular alumina of a particle size of −325 mesh. The addition of the alumina was made while the electric-motor-propeller stirring the solution to insure that all particles were fully wetted and the viscosity remained relatively constant. The slurry was then ready for coating of the metal grid.

EX. 2

490 grams of powdered fused silica (Nalcast P-1W) was added to 210 grams of colloidal silica (Nalcoag 1030) and was stirred thoroughly with an electric-motor-propeller. Mixing was continued for 1½ hours to insure that the slurry reached equilibrium—that is, all of the particles were fully wetted and the viscosity remained relatively constant. The slurry was then ready for coating of the metal grid.

EX. 3

62 grams of water was added and thoroughly mixed into 188 grams of aqueous colloidal silica (30% solids). Complete stirring was continued to insure an intimate solution of the silica and water. To this solution 750 grams of zircon powder was added while stirring with a motor-driven propeller. This stirring was continued for two hours to insure complete wetting of all the zircon particles and a uniform viscosity. The slurry was then ready for coating the metal grid.

FORMING THE COMPOSITE

The composite is made by applying the viscous ceramic slurry to the grid so that the slurry fully coats and fills all the openings in the grid, after which the coated grid is dried and then fired. The slurry is best applied to the grid by dipping the grid into the slurry. In many cases a multiple dipping operation is desirable. That is, after a first dip the slurry thereby applied to the grid is allowed to dry after which there is application of additional ceramic by another dip into the slurry. Since the dried ceramic slurry is generally pliable it is possible to re-shape or machine the composite prior to the firing operation to cylindrical or other shape after the ceramic is applied to the grid. Alternatively, the grid can first be shaped into a cylinder, or other shape as desired, and the ceramic slurry then applied to the shaped grid.

As has been indicated, after the ceramic is applied to the metal grid and allowed to dry, the ceramic with the grid imbedded therein is fired to a temperature sufficient to convert the ceramic to a unitary or monolithic structure. At the firing temperature, the metal grid, because of its higher coefficient of thermal expansion, is in an expanded condition and the ceramic is a rigid monolithic structure while at the high temperature at which the metal grid is in its expanded condition. Hence, once cooling starts and as cooling continues, and the metal grid contracts from its expanded condition, the metal grid is thereby put into tension and the rigid ceramic is put into compression. Upon completion of cooling, manufacture is complete.

The following is a specific example of the practice of the method of the invention, the slurry used being that set forth in Example 1 above:

A 16 mesh screen metal grid of Inconel 600 was degreased by rinsing in methanol and low temperature dried. To coat the screen with the slurry, it was dipped into the slurry and slowly removed vertically, permitting the slurry to adhere to the wires of the screen and fill all the interstices of the screen. After withdrawal from the container of slurry and air drying for 30 minutes (during the early stages of which drying operation the coated grid was slowly revolved in a vertical plane to prevent ceramic build-up at one end due to gravity) the composite was oven baked at 25° F. increments for about 15 minutes at each temperature from 100° F. to 500° F. The temperature was raised at a relatively slow rate, as described, to better assure against the formation of gas bubbles or separation of the ceramic. The composite was then fired in air at 1800° F. for 30 minutes at ordinary atmospheric pressure and then allowed to cool to room temperature. If desired, other methods, such as use of a vacuum furnace or micro-wave heating or induction heating, can be used for the drying and heating to preclude localized internal gas build-up and the ensuing loss of integrity of the ceramic matrix structure.

Figure 4:
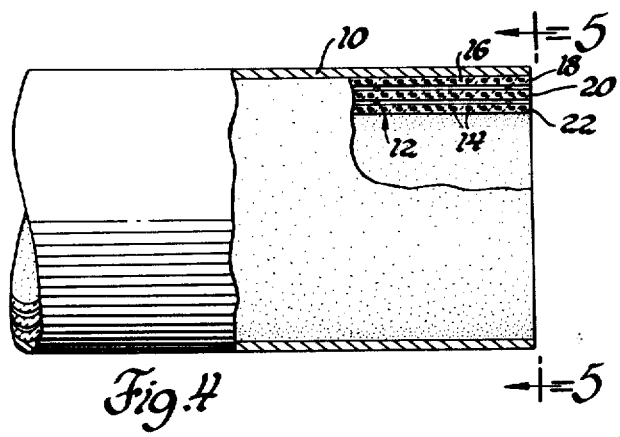
FIG. 4 is a view similar to that of FIG. 1 but showing another embodiment of the invention.
Figure 5:
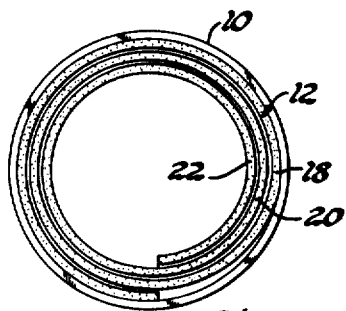
FIG. 5 is a view taken on the line 5—5 of FIG. 4.

FIGS. 4 through 6 show another embodiment of the invention wherein there are incorporated multiple layers of the composite, adjacent layers being slightly spaced to provide thin air gaps between the layers. Referring to FIGS. 4 and 5, 10 is a metal tube and 12 is a tubular multiple layer composite made in accordance with the invention and functioning as a thermal insulator to prevent heat loss from hot gases or other fluid flowing through the tube. As can best be seen in FIG. 5, the composite comprises a grid 14 which is imbedded in ceramic 16 and which is spirally wound thereby to provide a tube having three substantially parallel or concentric layers 18, 20 and 22. As best shown in FIG. 6, spaced, spirally wound heat resistant wires, such as shown at 24 and 26, between the layers, provide the spacing, and hence an air gap, between adjacent layers, the thickness of the air gap being determined by the diameter of the spirally wound wires. The metal grid of the FIGS. 4–6 embodiment instead of being a screen of interwoven wires is an expanded metal grid. One conventional and inexpensive method for making such a grid is to provide a thin sheet of the metal with staggered parallel rows of slits and thereafter pulling the sheet in a direction transverse to the slits whereupon the diamond shape openings, as shown, are formed. The metal grid can be used in the precise form as results from the pulling operation or can thereafter be put through rollers to roll it into a flat configuration such as that shown in FIG. 6. A metal grid of the same structure can be accomplished by punching a metal sheet to provide the openings; however, this is far more expensive because of the large amount of metal scrap which results. Expanded metal grids are well known in the art and it should be understood that the precise method of manufacture is not important to the present invention nor is the shape of the openings so long as the grid structure is such that it can be put into tension not just in one direction but in directions perpendicular to each other.

To manufacture the embodiment shown in FIGS. 4 through 6, a rectangular shaped piece of the metal grid is coated with the ceramic slurry, as described with reference to the FIGS. 1-3 embodiment, and then, after drying, spaced parallel heat resistant metal wires are placed on the ceramic coated metal grid. This assembly is then spirally wound in a direction in which the metal wires extend thereby to result in the spirally wound configuration as shown in the drawings. The resultant tubular structure is then fired to a temperature to cause the ceramic to form a monolithic structure and is thereafter cooled to complete the manufacture.

Means other than the wires 24 and 26 can be used to provide the spacing between adjacent layers. For example, prior to spirally winding the ceramic coated metal grid to a tubular shape the surface thereof can be provided with a plurality of relatively widely spaced relatively large grains of ceramic or other refractory material, the size of the grains determining the spacing between adjacent layers when such structure is spirally wound. As still another alternative, the metal grid itself can be provided with spaced dimples to provide the desired spacing between adjacent layers. A thin air gap between adjacent layers provides additional thermal insulation; however, it should be understood for some applications it may be desirable to use multiple layers of the composite material but with no large spacing between the ceramic layers imbedding with metal grid. To manufacture such structure it is necessary only to eliminate the heat resistant metal wires or other means for providing the gap between the layers.

The composites of the invention are particularly suited for tubular shapes such as shown in the drawings; however, it should be understood that whereas the two embodiments shown are of tubular shape, composites of the present invention can take other forms such, for example, as a flat planar form.

As regards internal combustion engines, another application for the composite of the invention is as a thermal insulator for the combustion chamber and the engine head adjacent to the exhaust gas ports to thereby regulate localized heat flow to the engine coolant. This is desirable because if heat flow to the coolant is too rapid the coolant at such location can be vaporized thereby forming gas bubbles or pockets which tend to inhibit heat flow. By using the thermal insulation in the head or in the engine block adjacent the combustion chambers, there is increased temperature control and hence decreased harmful emission and increased fuel economy.

The ceramic-metal grid composite of the present invention has been described particularly with reference to its use as a thermal insulator because the composite demonstrates such remarkable thermal insulating properties.

An investigation of the insulating properties of three layers of the composite material was conducted in the following method:

A 4½ inch diameter cylinder of stainless steel 7 inches long and 0.072 inches thickness was lined with three concentric cylindrical sections of the composite insulation. A slurry of tabular alumina and sodium silicate such as that made in Example 2 above was prepared. Three cylinders of 16 mesh Inconel screen were made by joining the seam of the individual cylinder by tack welding. These concentric cylinders were degreased in methanol and after drying dipped in the slurry mixture providing a viscous coating. After air drying the slurry, the structures were oven dried at temperature steps of 25° F. starting at 100° F. After reaching 500° F. the structures were then fired at 1750° F. in air at ordinary atmospheric pressure to complete the sintering process. The metal grid-ceramic composite cylinders were then concentrically mounted within the stainless steel cylinder, separating their surfaces by spaced circumferentially extending Inconel 600 wires to provide a stagnant air space between adjacent cylinders. The thickness of each cylinder was about 1/16 inch and the size of the cylinders was such that the spacing between adjacent cylinders was about 0.06 inches. Thermocouples (T4) were welded in place on the outer surface of the metallic cylinder. Additional thermocouples (T1) were secured to the inner surface of the innermost composite cylinder; thermocouples (T2) were set in place between the innermost and middle composite cylinders and thermocouples (T3) between the middle and outermost composite cylinder. The entire unit was placed on fire brick supports and a burner nozzle placed in the top opening pointing downward. The burner was also supported by fire brick and covered by asbestos sheet in such a manner that all secondary air was brought to the burner from outside the apparatus. A mixture of propane and air was burned at several throttle settings and when temperatures stabilized tempertures were recorded providing comparative data showing the insulating effect on each successive layer. Table I gives the results of the test.

TABLE I

| INSIDE TEMP. (T1) °F. | TEMP. °F. (T2) | TEMP. °F. (T3) | TEMP. °F. (T4) |
|---|---|---|---|
| 1025 | 880 | 660 | 453 |
| 1500 | 1355 | 1050 | 728 |
| 1900 | 1675 | 1312 | 880 |

A second test apparatus was prepared in accordance with the above apparatus except that zircon refractory was substituted for the tabular alumina. Similar test procedures were conducted with the results given in Table II.

TABLE II

| INSIDE TEMP. (T1) °F. | TEMP. °F. (T2) | TEMP. °F. (T3) | TEMP. °F. (T4) |
|---|---|---|---|
| 1000 | 870 | 600 | 430 |
| 1500 | 1320 | 1000 | 670 |
| 1900 | 1700 | 1315 | 875 |

These tests show a significant temperature drop across approximately 5/16 inch of the composite insulation with small air spaces between adjacent layers.

In another application, the insulation was wrapped concentrically upon itself to provide three layers totaling 3/16 inch thick and inserted into a cylindrical stainless steel container 3¾ inches in diameter and 10 inches long. An automotive reducing catalyst was then placed within the insulation and the container welded shut with entry and exit pipes to conduct engine exhaust through the catalyst.

This test shows a significant temperature drop across approximately 3/16 inch of insulation with minimal air spaces between layers. Thermocouples were placed in the center of the catalyst and on the surface of the stainless steel container, the metal thickness of which was 0.040 inches. The catalyst canister was attached to the standard exhaust manifold of an independent testing laboratory's Plymouth 318 CID-V8 engine for dynamometer testing. Steady state loads and throttle settings were conducted and when temperatures stabilized gas temperatures in the catalyst and skin temperatures were recorded. These are listed in Table III and show the insulation's significant effect in reducing temperatures.

TABLE III

| Exhaust Gas Temp. °F. | Canister Skin Temp. °F. |
|---|---|
| 899 | 261 |
| 1048 | 286 |
| 1140 | 338 |
| 1232 | 400 |
| 1344 | 453 |
| 1441 | 504 |

Another test of an insulated catalyst canister and insulated exhaust manifold made similarly to that of the previous stationary dynomometer test was conducted by an independent testing laboratory. This test was conducted on a 1975 Plymouth 318 CID-V8 Fury automobile with the catalyst installed and instrumented with thermocouples to determine the gas and surface temperatures. The automobile was placed on a chassis rolls dynamometer and run in accordance with the EPA Hot Start CVS emission test procedures. Exhaust gas temperatures and canister and insulated exhaust manifold skin temperatures were recorded. These are presented in Table IV. It can be seen that the insulative capabilities of the composite material are outstanding.

TABLE IV

| Exhaust Gas Temperature °F. | Canister Skin Temp °F. | Exhaust Manifold Skin Temp °F. |
|---|---|---|
| 1220 | 412 | 495 |
| 1290 | 465 | 495 |
| 1330 | 480 | 510 |
| 1350 | 500 | 540 |
| 1370 | 565 | 610 |

Table IV results are somewhat scattered compared to those of Table III due to the type of tests conducted. Table III data were obtained from a steady state dynamometer test, whereas Table IV data were taken during an EPA Hot Start CVS test where the engine temperatures are in a transient condition for the most part.

It should be understood that the composites of the present invention may find other uses, such, for example, as structural elements requiring high heat resistance. It should be further mentioned that the composites of the present invention not only demonstrate excellent thermal insulating properties but also excellent acoustical barrier properties. This is significant, for example, when the composites are used in automotive vehicle exhaust systems since they not only provide good thermal insulation but also acoustical barrier properties thereby reducing the noise level normally associated with such exhaust system.

Additionally, the composites of the present invention permit development of materials with special properties not possible by other techniques such as heat resistant catalyst supports. Such use can be illustrated by reference to the embodiment described with reference to FIGS. 1-3 wherein the composite shown constitutes the lining in the exhaust pipe leading from the engine to a catalytic converter of an automotive vehicle. By catalyzing the interior surfaces of the tubular lining, the lining serves not only as a thermal insulator and acoustical barrier, but also as a catalytic device for catalyzing the oxidation of unburned or partially burned hydrocarbons in the exhaust gases to carbon dioxide and water or, alternatively, for reducing the oxides of nitrogen in the exhaust gases. The catalytic materials which demonstrate the catalytic activity for performing such functions are well known in the art, for example, platinum, palladium, copper and the transition metals, or the oxides of these metals. To incorporate such a catalyst into the composite, the catalytic material can be applied in powder form, for example, to the surface of the ceramic prior to firing or, alternatively, can be incorporated into the ceramic itself.

Hence, it will be understood that whereas the invention has been described with reference to certain embodiments thereof, various changes and modifications may be made all within the full and intended scope of the claims which follow.

I claim:

1. An insulated component for an internal combustion engine comprising: a cast metal engine component wall that is heated during engine operation; a metal-ceramic liner of a hollow shape about which the wall extends in direct engagement therewith; said metal wall being cast about said hollow metal-ceramic liner with the liner in situ; said metal-ceramic liner including a monolithic layer of ceramic material formed from a slurry and having imbedded therein a metal grid including openings which are closed by said ceramic material; and said metal grid having a melting temperature higher than the temperature at which the slurry forms into said monolithic ceramic layer and having a higher coefficient of thermal expansion than the ceramic material.

2. An insulated component for an internal combustion engine comprising: a cast metal engine component wall that is heated during engine operation; a metal-ceramic liner of a hollow shape about which the wall extends in direct engagement therewith; said liner including a plurality of layers spaced from each other; said metal wall being cast about said hollow metal-ceramic liner with the liner in situ; said metal-ceramic liner including a monolithic layer of ceramic material formed from a slurry and having imbedded therein a metal grid including openings which are closed by said ceramic material; and said metal grid having a melting temperature higher than the temperature at which the slurry forms into said monolithic ceramic layer and having a higher coefficient of thermal expansion than the ceramic material.

* * * * *